(12) United States Patent
Kies et al.

(10) Patent No.: US 9,665,198 B2
(45) Date of Patent: May 30, 2017

(54) SYSTEM AND METHOD FOR OPTIMIZING HAPTIC FEEDBACK

(71) Applicant: QUALCOMM Incorporated, San Diego, CA (US)

(72) Inventors: Jonathan Karl Kies, Encinitas, CA (US); Robert Scott Tartz, San Marcos, CA (US); Ted Ray Gooding, San Diego, CA (US); Jeremiah Bunao Salamante, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 14/271,209

(22) Filed: May 6, 2014

(65) Prior Publication Data
US 2015/0324049 A1 Nov. 12, 2015

(51) Int. Cl.
*G09G 5/00* (2006.01)
*G06F 3/041* (2006.01)
*G06F 3/01* (2006.01)

(52) U.S. Cl.
CPC ............ *G06F 3/0414* (2013.01); *G06F 3/016* (2013.01); *G06F 3/0416* (2013.01); *G06F 2203/014* (2013.01)

(58) Field of Classification Search
CPC ...... G06F 3/0414; G06F 3/016; G06F 3/0416; G06F 2203/014
See application file for complete search history.

(56) References Cited

U.S. PATENT DOCUMENTS

| 7,124,027 | B1 | 10/2006 | Ernst, Jr. et al. | |
| 8,482,381 | B2 | 7/2013 | Chatterjee et al. | |
| 2005/0177287 | A1* | 8/2005 | Wang | B60K 37/06 701/36 |
| 2007/0236450 | A1* | 10/2007 | Colgate | G06F 3/016 345/156 |
| 2009/0167508 | A1 | 7/2009 | Fadell et al. | |
| 2009/0312049 | A1 | 12/2009 | Isomursu | |

(Continued)

FOREIGN PATENT DOCUMENTS

EP 2375306 A1 10/2011

OTHER PUBLICATIONS

International Search Report and Written Opinion—PCT/US2015/026584—ISA/EPO—Jul. 10, 2015.

*Primary Examiner* — Amare Mengistu
*Assistant Examiner* — Crystal A Mathews
(74) *Attorney, Agent, or Firm* — Kilpatrick Townsend & Stockton, LLP

(57) ABSTRACT

Methods, systems, computer-readable media, and apparatuses for adjusting the manner in which haptic feedback is provided to the user based on physical characteristics of the user. Physical characteristics may include stable physical characteristics that are non-changing with respect to a level of physical activity of the user. Examples of such stable physical characteristics may include age, gender, race, visual impairments and/or other physical characteristics. In some embodiments, the mobile device may adjust the haptic feedback by adjusting the intensity of the haptic feedback, frequency of the haptic feedback, duration for which the haptic feedback is provided to the user and changing a type of haptic feedback provided to the user of the device.

30 Claims, 9 Drawing Sheets

(56) References Cited

U.S. PATENT DOCUMENTS

| | | | |
|---|---|---|---|
| 2012/0028577 A1* | 2/2012 | Rodriguez | H04N 21/44008 455/41.1 |
| 2012/0098789 A1* | 4/2012 | Ciesla | G06F 3/044 345/174 |
| 2012/0223880 A1 | 9/2012 | Birnbaum et al. | |
| 2012/0229401 A1 | 9/2012 | Birnbaum et al. | |
| 2012/0306631 A1* | 12/2012 | Hughes | G09B 21/009 340/407.1 |
| 2013/0063256 A1 | 3/2013 | Tartz et al. | |
| 2014/0074943 A1* | 3/2014 | Kanevsky | A61B 5/165 709/206 |
| 2014/0306814 A1* | 10/2014 | Ricci | H04W 48/04 340/425.5 |
| 2015/0294639 A1* | 10/2015 | McCoy | G06Q 10/10 345/173 |
| 2015/0316986 A1* | 11/2015 | Xue | G06F 3/041 345/173 |

* cited by examiner

SYSTEM AND METHOD FOR OPTIMIZING HAPTIC FEEDBACK

BACKGROUND

Aspects of the disclosure relate to haptic feedback. More specifically, aspects of the disclosure relate to a system and method for providing haptic feedback based on obtained physical characteristics for the user.

Mobile devices, e.g. smartphones, have become an indispensable tool for today's users. Users interact with mobile devices for a variety of reasons, including, but not limited to, making phone calls, accessing the Internet, playing video games and running various local applications on their mobile devices. In some implementations, the user interface may provide the user with haptic feedback in response to interactions with the mobile device. Some haptic feedback systems, such as haptic displays, take advantage of the sense of touch by applying forces, vibrations, motion, etc. Haptic feedback may be used for providing information to the user regarding their interactions with the device. For instance, a user pressing a key on a virtual keyboard displayed on the mobile device, may receive a slight vibration from the touch of the key providing tactile confirmation to the user that the key was pressed. In another example scenario, the mobile device running a car racing game may provide the user with information regarding the terrain and obstacles, using haptic feedback. Many applications may employ haptic feedback for enriching the user's interaction with the device.

BRIEF SUMMARY

Certain embodiments are described for a system and method for providing haptic feedback based on obtained physical characteristics for a user. This is unlike existing haptic feedback systems that provide a "one size fits all" approach to tactile feedback or provide a single setting to manually adjust the haptic feedback. Indeed, existing haptic feedback systems do not allow for flexible adaptation based on physical characteristics of the user. For example, the mobile device provides the same haptic feedback to different individuals with differing tactile sensitivity. In some instances, the difference in tactile sensitivity may be due to age, gender, and/or other physical characteristics.

Embodiments of the invention, as described herein, adjust the manner in which haptic feedback is provided to the user based on physical characteristics of the user. Physical characteristics may include stable physical characteristics that are non-changing with respect to a level of physical activity of the user. Examples of such stable physical characteristics may include age, gender, visual impairments and/or other physical characteristics. In some embodiments, the mobile device may adjust the haptic feedback by adjusting the intensity of the haptic feedback, adjusting the frequency of the haptic feedback, adjusting the duration for which the haptic feedback is provided to the user of the device, and changing a type of haptic feedback provided to the user of the device.

In one example method for providing haptic feedback on a device, the method may include obtaining, at the device, at least one stable physical characteristic associated with a user, wherein the at least one stable physical characteristic may include an at least one physical characteristic that may be non-changing with respect to a level of physical activity of the user, and automatically adjusting, by the device, a manner in which the haptic feedback is provided to the user of the device, based at least on the at least one stable physical characteristic. In one embodiment, the device may be a mobile device. In another embodiment, the device may be installed in a kiosk or a vehicle.

In some example implementations of the method, stable physical characteristic may include one or more of age, gender, finger size, race and visual impairments. Furthermore, in some example implementations, adjusting the manner in which haptic feedback is provided may include one or more of adjusting intensity of the haptic feedback, frequency of the haptic feedback, duration for which the haptic feedback is provided to the user of the device, and changing a type of haptic feedback provided to the user of the device. In one aspect of the method, a plurality of stable physical characteristics associated with the user may be obtained and automatically adjusted in a manner in which the haptic feedback is provided to the user of the device based on the plurality of stable physical characteristics. The automatic adjusting of the manner in which the haptic feedback is provided may not exceed a pre-determined constraint.

In one example embodiment, the method may further include automatically adjusting the manner in which the haptic feedback is provided based at least on retrieving data associated with a manual adjusting of a manner in which the haptic feedback is provided for a plurality of devices for the at least one stable physical characteristic.

An example device for providing haptic feedback may include a processor coupled to memory and configured to obtain at least one stable physical characteristic associated with a user, wherein the at least one stable physical characteristic comprises an at least one physical characteristic that is non-changing with respect to a level of physical activity of the user, and automatically adjust in a manner in which the haptic feedback is provided to the user of the device, based on the at least one stable physical characteristic. In one embodiment, the device may be a mobile device. In another embodiment, the device may be installed in a kiosk or a vehicle.

In some example implementations of the device, stable physical characteristic may include one or more of age, gender, finger size, race and visual impairments. Furthermore, in some example implementations, adjusting the manner in which haptic feedback is provided may include one or more of adjusting intensity of the haptic feedback, frequency of the haptic feedback, duration for which the haptic feedback is provided to the user of the device, and changing a type of haptic feedback provided to the user of the device. In one aspect of the device, a plurality of stable physical characteristics associated with the user may be obtained and automatically adjusted in a manner in which the haptic feedback is provided to the user of the device based on the plurality of stable physical characteristics. In one implementation of the device, the automatic adjusting of the manner in which the haptic feedback may be provided may not exceed a pre-determined constraint.

In one example embodiment, the device may further include automatically adjusting the manner in which the haptic feedback is provided based at least on retrieving data associated with a manual adjusting of a manner in which the haptic feedback may be provided for a plurality of devices for the at least one stable physical characteristic.

In one example on-transitory computer-readable storage medium for providing haptic feedback on a device, wherein the non-transitory computer-readable storage medium comprises instructions executable by a processor, the instructions comprising instructions to obtain, at the device, at least one stable physical characteristic associated with a user, wherein the at least one stable physical characteristic may include an at least one physical characteristic that may be non-changing with respect to a level of physical activity of the user, and automatically adjust, by the device, a manner in which the haptic feedback is provided to the user of the device, based at least on the at least one stable physical characteristic. In one embodiment, the device comprising the non-transitory computer-readable storage medium may be a mobile device. In another embodiment, the device comprising the non-transitory computer-readable storage medium may be installed in a kiosk or a vehicle.

In some example implementations of the non-transitory computer-readable storage medium, stable physical characteristic may include one or more of age, gender, finger size, race and visual impairments. Furthermore, in some example implementations, the non-transitory computer-readable storage medium may include instructions for adjusting the manner in which haptic feedback is provided and may include one or more of adjusting intensity of the haptic feedback, frequency of the haptic feedback, duration for which the haptic feedback is provided to the user of the device, and changing a type of haptic feedback provided to the user of the device. In one aspect, the non-transitory computer-readable storage medium may include instructions to obtain a plurality of stable physical characteristics associated with the user and automatically adjust a manner in which the haptic feedback is provided to the user of the device based on the plurality of stable physical characteristics. The automatic adjusting of the manner in which the haptic feedback is provided may not exceed a pre-determined constraint.

In one example embodiment, the non-transitory computer-readable storage medium may further include instructions to automatically adjust the manner in which the haptic feedback is provided based at least on retrieving data associated with a manual adjusting of a manner in which the haptic feedback is provided for a plurality of devices for the at least one stable physical characteristic.

In one example apparatus for providing haptic feedback, the apparatus may include means for obtaining, at the device, at least one stable physical characteristic associated with a user, wherein the at least one stable physical characteristic may include an at least one physical characteristic that may be non-changing with respect to a level of physical activity of the user, and means for automatically adjusting, by the device, a manner in which the haptic feedback is provided to the user of the device, based at least on the at least one stable physical characteristic. In one embodiment, the apparatus may be a mobile device. In another embodiment, the apparatus may be installed in a kiosk or a vehicle.

In some example implementations of the apparatus, stable physical characteristic may include one or more of age, gender, finger size, race and visual impairments. Furthermore, in some example implementations, adjusting the manner in which haptic feedback is provided may include one or more of means for adjusting intensity of the haptic feedback, frequency of the haptic feedback, duration for which the haptic feedback is provided to the user of the apparatus, and changing a type of haptic feedback provided to the user of the apparatus. In one aspect of the apparatus, a plurality of stable physical characteristics associated with the user are obtained and automatically adjusted in a manner in which the haptic feedback is provided to the user of the apparatus based on the plurality of stable physical characteristics. The automatic adjusting of the manner in which the haptic feedback is provided may not exceed a pre-determined constraint.

In one example embodiment, the apparatus may further include means for automatically adjusting the manner in which the haptic feedback is provided based at least on retrieving data associated with a manual adjusting of a manner in which the haptic feedback is provided for a plurality of apparatuses for the at least one stable physical characteristic.

Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION

Figure 1:
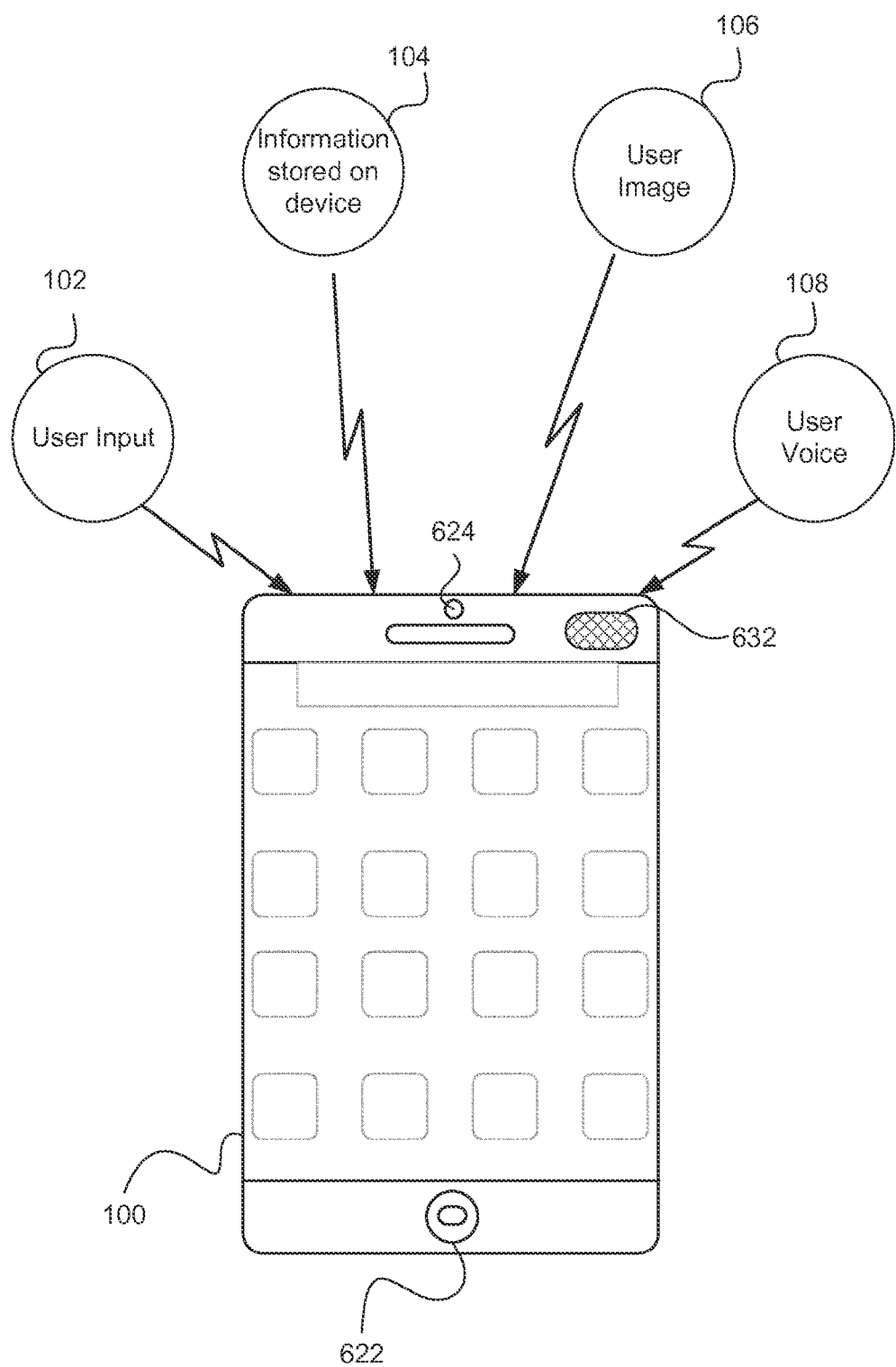
FIG. 1 illustrates a simplified diagram of a mobile device that may incorporate one or more embodiments of the invention.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

As described herein, in one embodiment of the invention, a "mobile device" may refer to any electronic device that may be transported and operated by a user. Examples of mobile devices may include, but are not limited to, mobile phones (e.g. cellular phones), PDAs, tablet computers, net books, laptop computers, personal music players, hand-held specialized readers, wearable devices, etc. In addition, mobile devices may include handheld devices, such as remote controls. In some implementations, these remote control devices may include touchscreens capable of providing haptic feedback to the user and communicating with a remote device, such as a Television. The mobile device may be implemented using one or more components described in FIG. 6. Even though embodiments of the invention are described in terms of a mobile device, other stationary computing devices, such as kiosks, personal computers, workstations, touchscreen displays, televisions, consoles and gaming systems, may be used instead of a mobile device without departing from the scope of the invention.

As described herein, haptic feedback may refer to the feedback provided by a computing device to the user in response to the user interacting with the computing device. Some haptic feedback systems, such as haptic displays, take advantage of the sense of touch by applying forces, vibrations, motion, etc. Haptic feedback may be used for providing information to the user regarding their interactions with the device. For instance, a user pressing a key on a virtual keyboard displayed on the mobile device, may receive a slight vibration from the touch of the key providing tactile confirmation to the user that the key was pressed. In another example, the mobile device for a mobile device user playing a car racing game may provide the user with information regarding the terrain and obstacles using haptic feedback. For example, the haptic feedback may become more vigorous on a dirt road than a paved road.

As described herein, stable physical characteristics may refer to physical characteristics that are non-changing with respect to a level of physical activity of the user. For example, age, gender, race, hand size, finger size, visual and other impairments and any other physical characteristics of the user that are stable over an appreciable period of time and may affect the sensitivity of the user to haptic feedback may be referred as stable physical characteristics.

Embodiments of the invention generally describe automatically adjusting settings for haptic feedback on a mobile device based on contextual information, such as stable physical characteristics of the user. Most haptic displays provide a "one size fits all" approach to tactile feedback or provide a single setting to manually adjust the haptic feedback. This does not allow for flexible adaptation. The current mobile device provides the same haptic feedback to different individuals with differing tactile sensitivity. For example, tactile sensitivity may change with the age of a user. Current haptic technologies do not account for such differences in tactile sensitivity for different users making it difficult for users with tactile sensitivity different from the average user to operate the device.

Embodiments of the invention may detect one or more stable physical characteristics associated with a user of the mobile device in order to improve the user experience with regard to the mobile device providing haptic feedback. There are a variety of stable physical characteristics that may impede one's sensitivity to touch. Determining these characteristics and then adjusting the saliency of the haptic effect accordingly may provide a relatively uniform experience for all users. As described herein, techniques discussed enable the mobile device 100 to account for various stable physical characteristics associated with the users, such as age, gender, race, hand size, finger size and visual impairments and provide a uniform experience for all users. Taking into account for such differences between users allows embodiments of the invention to normalize the user experience for different demographics of individuals using the mobile device, instead of providing a "one size fits all" solution targeted towards a presumed demographic.

Embodiments of the invention may also be extended to devices that use haptic feedback technology without displays and also displays that allow for multiple user interaction (e.g., table displays, kiosks) without departing from the scope of the invention. Embodiments of this invention may improve overall haptic feedback experience for users who have a tactile sensitivity that is different from the average user. Embodiments of the invention may also reduce the need for manual changes to settings and in some aspects provide for real-time, automatic modification of settings for haptic feedback systems.

In some embodiments of the invention, a baseline amplitude may be used to generate the tactile sensation. Based on one or more stable physical characteristics, this baseline may be increased or decreased. The change may be permanent or can be dynamically adjusted based on the task. Stable physical characteristics may include, but are not limited to age, gender, finger size, and/or visual impairments. In some implementations, adjustment due to multiple factors may be merged together and scaled lower or capped to avoid radical changes to the settings.

FIG. 1 illustrates a simplified diagram of a mobile device 100 that may incorporate one or more embodiments of the invention. The mobile device 100 may obtain one or more stable physical characteristics associated with the user. In one aspect, stable physical characteristics may include at least one physical characteristic that is non-changing with respect to a level of physical activity of the user. Examples of stable physical characteristics may include, but are not limited to one or more of age, gender, finger size, and/or visual impairments.

As shown in FIG. 1, the mobile device 100 may receive input regarding the mobile device user that may include user input 102 (via an input device 620, shown in FIG. 6), user image 106 information and/or user voice 108. In some instances, the mobile device 100 may also use user data previously stored 104 on the mobile device 100 to perform embodiments of the invention. In some instances, the user data stored on the device 104 may be retrieved from a remote server and/or device.

The mobile device 100 may receive input regarding the user from a variety of input devices such as one or more microphones 622, cameras 624, virtual/physical keyboards (not shown) or any other suitable input device. In one aspect, the mobile device 100 may receive direct user input 102 from the user regarding their stable physical characteristics. For example, a user with visual impairments may provide that information to the mobile device 100 using a user interface.

In another aspect, the mobile device 100 may receive user information over a network using a communications subsystem 650 or access information stored on the mobile device 100 in the storage device 615 or the working memory 640. For example, the user may store on the mobile device 100 and/or retrieve over the network their own profile for a social networking site. Such a profile may include user information such as age, gender, impairments, and/or other stable physical characteristics regarding the user that may be accessed and used by the mobile device 100 for automatically adjusting the haptic feedback setting for the mobile device 100.

In yet another aspect, the mobile device 100 may obtain an image 106 of the user using one or more cameras 624 and/or the user's voice 108 using one or more microphones 622. In one embodiment, the components of the mobile device 100 may determine stable physical characteristics for the user using the user's image 106 and/or voice 108. For example, the mobile device 100 may be able to determine the user's gender using user's voice. In some embodiments, the mobile device 100 may use the image data and voice data together along with other factors to determine the user's stable physical characteristics.

The mobile device 100 may determine the stable physical characteristics for the user of the mobile device 100 using one or more of user input 102, information stored on the device 104, user image 106, user voice 108 and/or any other suitable input mechanism, as discussed above. The mobile device 100 may then automatically adjust a manner in which the haptic feedback is provided to the user of the mobile device 100, based at least on one or more stable physical characteristics for the user. As indicated previously, stable physical characteristics may include age, gender, finger size and/or visual impairments.

For example, in some instances, as age progresses, some users may experience reduced haptic sensitivity. Similarly, for some users, the gender of the user may also be correlated with haptic sensitivity for the user. For example, some men may experience reduced sensitivity to touch relative to women. The mobile device 100 may determine the user's age and/or gender using user input 102, user image 106, user voice 108 or user profile information. User's age and/or gender might also be determined through a self-portrait or various soft biometrics such as hair and face characteristics. In one example, the haptic feedback may change in response to the user's age in a scaled manner. For instance, in one implementation, the haptic feedback may be increased by 2.5% for users in the range of 50-70 years of age and 5% for users above 70 years of age.

Also, in some embodiments, users with larger fingers may experience reduced sensitivity. Fingertip pressure may also reduce tactile sensitivity. For example, static fingertip pressure over a critical threshold and dragging the finger across an electrostatic display with high pressure may also reduce the sensation for haptic feedback. Therefore, embodiments of the invention may increase the haptic feedback for pressure applied beyond a pre-determined threshold. In some embodiments, fingertip pressure may be measured either by integrated pressure sensors residing behind the display or by indirectly measuring fingertip pressure via the number of capacitive touch sensor pixels contacted on the touchscreen display.

In some scenarios, users with visual impairments on average may have significantly better sensitivity with respect to users without the visual impairments. Embodiments of the invention may decrease the haptic feedback for users with visual impairments. This may result in a better user experience for users who have above average sensitivity to haptic feedback. In one embodiment, the user may provide information to the mobile device 100 regarding their visual impairments. Yet, in other embodiments, the mobile device may derive information regarding the user using their social profiles. For instance, the user's profile may provide information regarding user's visual impairments.

In one embodiment, the mobile device 100 may adjust the haptic feedback so that the haptic feedback does not increase above or decrease below pre-determined constraints. In some implementations, adjusting the feedback may include one or more of adjusting intensity of the haptic feedback, adjusting frequency of the haptic feedback, adjusting duration for which the haptic feedback is provided to the user of the mobile device 100, changing a type of haptic feedback provided to the user of the mobile device 100 and/or any combination thereof. Even though embodiments or the invention are discussed in terms of a mobile device, other computing devices operating in kiosks and vehicles may be used without departing from the embodiments of the invention.

Figure 2A:
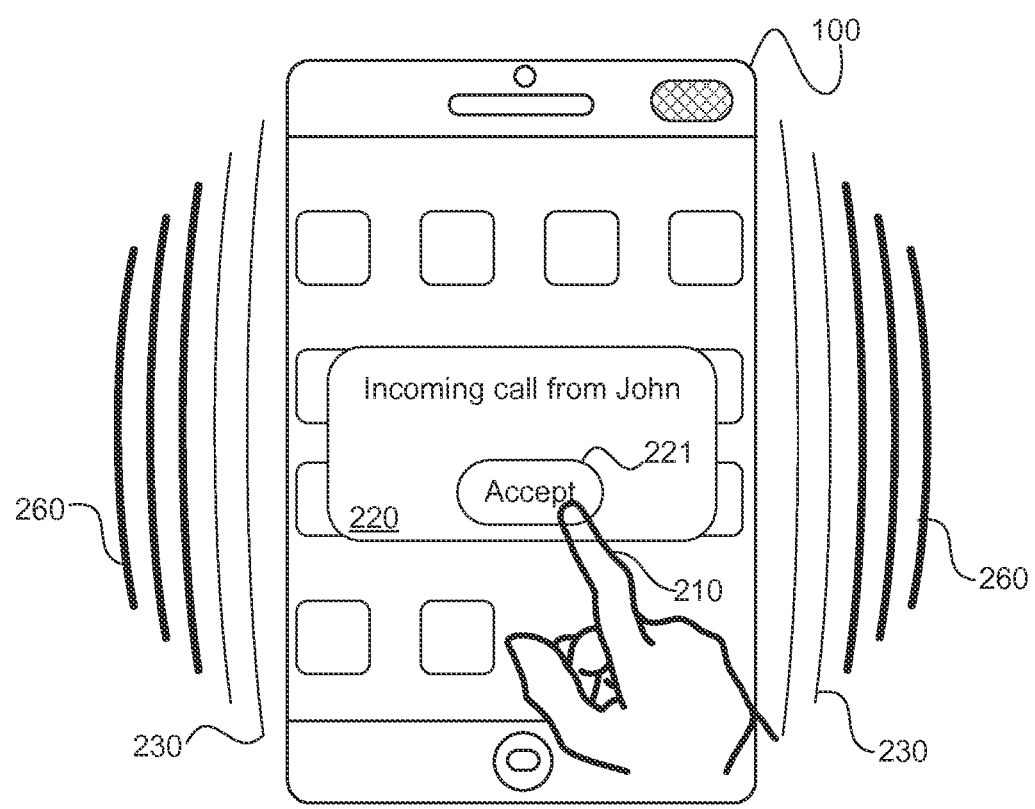
FIG. 2A illustrates providing vibration-based haptic feedback on a mobile device, according to some embodiments.

FIG. 2A illustrates providing vibration-based haptic feedback on a mobile device 100, according to some embodiments. Vibration-based haptic feedback may also be referred to as vibrotactile feedback. The vibration-based haptic feedback may include standard vibration-based haptic feedback 230 and increased intensity vibration-based haptic feedback 260. The increased intensity vibration-based haptic feedback 260 may result in a more pronounced vibration of the mobile device 100 that may be easier for the user to sense, feel, or otherwise notice. As described above, vibration-based haptic feedback is one of many types of haptic feedback that may be provided on the mobile device 100. An intensity of the vibration-based haptic feedback may be adjusted based upon stable physical characteristics for the user.

In FIG. 2A, the standard vibration-based haptic feedback 230 exemplifies the feedback provided when the stable physical characteristic (SPC) detection module 308 determines that the obtained values for the various stable physical characteristics are average or close to average and the haptic feedback settings do not need to be automatically adjusted. By contrast, in some embodiments, the increased intensity vibration-based haptic feedback 260 exemplifies the feedback provided when the SPC detection module 308 determines that the obtained stable physical characteristics represent a diminished sensitivity to haptic feedback for the user.

In some embodiments, the vibration-based haptic feedback may be provided in response to an interaction with the user. For example, the mobile device 100 may provide the user with haptic feedback in response to the user touching a key on the virtual keyboard displayed on the mobile device 100. In another embodiment, the vibration-based haptic feedback may be provided in response to an event notification 220 generated by the mobile device 100. For example, the event notification 220 can be a notification for an incoming call on the mobile device 100. For example, upon receiving an incoming call, the mobile device 100 may provide vibration-based haptic feedback, e.g. by using vibration motor 634, to notify the user of such. In one implementation, the intensity of the vibration may be based on the obtained stable physical characteristics.

The user may then decide to accept the incoming call and move their finger 210 over the "Accept" button 221, to which the mobile device 100 may provide haptic feedback confirming the user's response. For example, once the user moves his/her finger 210 over the "Accept" button 221 within the event notification 220 window, the mobile device 100 may provide vibration-based haptic feedback to indicate to the user that he/she has correctly interacted with the event notification 220. Similar to providing the vibration-based haptic feedback for the incoming call, described above, the mobile device 100 may provide either standard vibration-based haptic feedback 230 or increased intensity vibration-based haptic feedback 260 depending on if the user's detected stable physical characteristics indicate that the user has lower sensitivity to haptic feedback.

In some embodiments, where more than one button 221 exists, the mobile device 100 may provide a different type or intensity for haptic feedback per each button interaction. For example, if two buttons 221 are presented to the user representing a "Yes" and a "No" selection, the mobile device 100 may provide two rapid instances of vibration-based haptic feedback for a "Yes" selection and one rapid instance of vibration-based haptic feedback for a "No" selection. Alternatively, the mobile device 100 may provide increased intensity vibration-based haptic feedback 260 for a "Yes" selection and standard vibration-based haptic feedback 230 for a "No" selection.

In some embodiments, the mobile device 100 may provide audio feedback concurrently with the vibration-based haptic feedback. For example, the mobile device 100 may play an audio phrase, via speaker 632, reciting "Incoming call from John" concurrently with the vibration-based haptic feedback for the event notification 220. Similarly, the mobile device 100 may play an audio phrase, via speaker 632, reciting "Call accepted" concurrently with the vibration-based haptic feedback to indicate to the user that he/she has correctly interacted with the event notification 220. In some embodiments, more than one type of haptic feedback may be provided concurrently by the mobile device 100. For example, the vibration-based haptic feedback 230 may be provided concurrently with electrostatic-based haptic feedback and/or thermal-based haptic feedback.

Figure 2B:
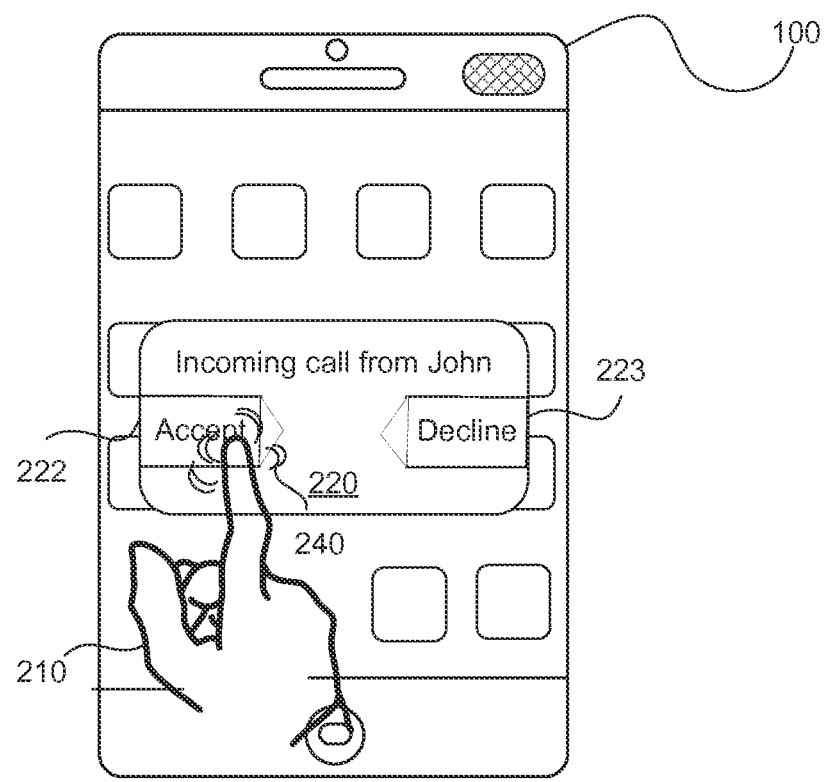
FIG. 2B and FIG. 2C illustrate providing electrostatic-based haptic feedback on a mobile device, according to some embodiments.
Figure 2C:
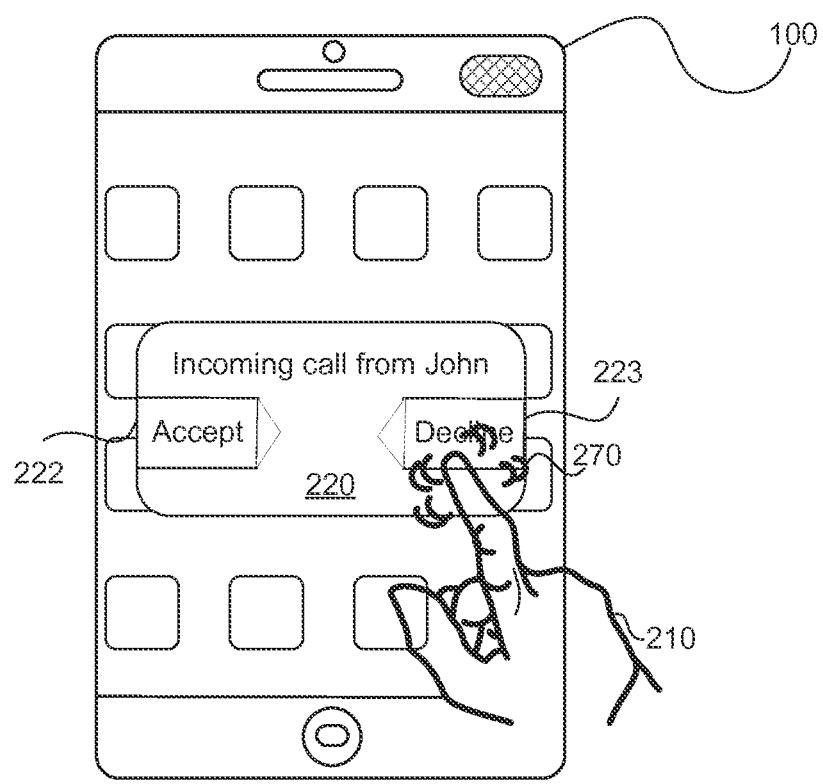

FIG. 2B and FIG. 2C illustrate providing electrostatic-based haptic feedback on a mobile device 100, according to some embodiments. The electrostatic-based haptic feedback includes standard electrostatic-based haptic feedback 240 (as shown in FIG. 2B) and increased intensity electrostatic-based haptic feedback 270 (as shown in FIG. 2C). The increased intensity electrostatic-based haptic feedback 270 may result in more pronounced electrostatic feedback of the mobile device 100 that may be easier for the user to sense, feel, or otherwise notice. As described above, electrostatic-based haptic feedback is one of many types of haptic feedback that may be provided on the mobile device 100. An intensity of the electrostatic-based haptic feedback may be changed based upon determining, by the mobile device, one or more stable physical characteristics associated with the user indicating a diminished sensitivity to haptic feedback by the user.

It can be appreciated that electrostatic-based haptic feedback includes any type of haptic feedback provided using varying electrostatic fields that can be effectuated beyond a pane of glass on the display 660 to give the user the feeling of various levels of friction, simulating textured surfaces. This is in contrast to vibration-based haptic feedback, where the mobile device 100 or the display screen may vibrate rather than providing feedback in individual feedback areas. The electrostatic unit 636 may generate the electrostatic fields. Another differentiating feature, in some implementations, may be that electrostatic-based haptic feedback may need dynamic shear or tangential movement of the fingers across the display to feel the texture, whereas vibration-based haptic feedback may simply need a static touch (i.e. normal movement with respect to the display).

The electrostatic-based haptic feedback may be provided as responses to interactions made by the user. In an example, in the process of receiving an incoming call, the mobile device 100 may provide vibration-based haptic feedback to notify the user of such, as described in FIG. 2A. It can be appreciated that any other type of haptic or non-haptic feedback can be provided to the user to notify him/her of the event notification 220. The user may then decide to accept the incoming call and move his/her finger 210 over the "Accept" button 222, to which the mobile device 100 may provide haptic feedback confirming the user's response. For example, once the user moves his/her finger 210 over the "Accept" button 222 within the event notification 220 window, the mobile device 100 may provide electrostatic-based haptic feedback to indicate to the user that he/she has correctly interacted with the event notification 220. In one embodiment, the intensity of the electrostatic-based haptic feedback may be based on the detection of one or more stable physical characteristics using the SPC detection module 308.

In some embodiments, where more than one button exists, the mobile device 100 may provide a different type or intensity of haptic feedback per each button interaction. For example, as shown in FIG. 2B and FIG. 2C, two buttons may be presented to the user representing an "Accept" 222 and a "Decline" 223 button selection, where the mobile device 100 may provide one instance of electrostatic-based haptic feedback for an "Accept" swipe by the user and another instance of electrostatic-based haptic feedback for a "Decline" swipe selection by the user. Alternatively, the mobile device 100 may provide standard electrostatic-based haptic feedback 240 for an "Accept" swipe selection, as shown in FIG. 2B and an increased electrostatic-based haptic feedback 270 for a "Decline" swipe selection, as shown in FIG. 2C.

Figure 2D:
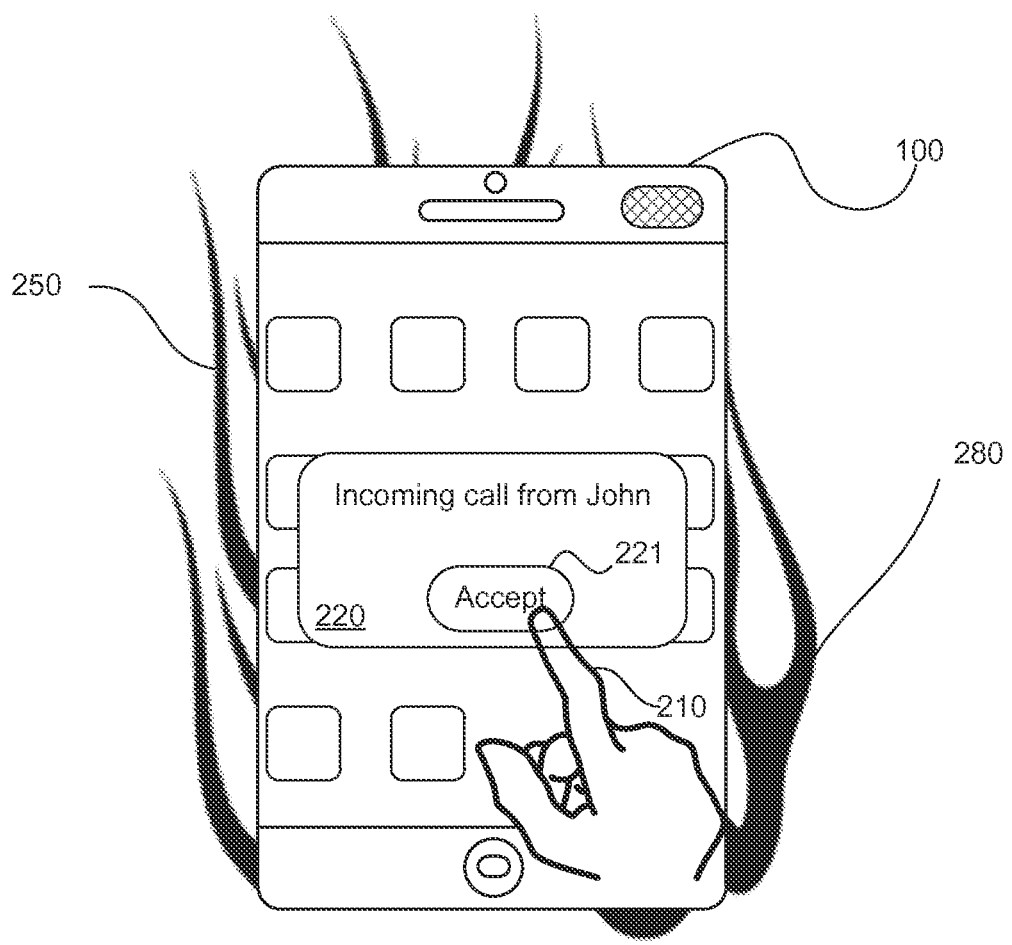
FIG. 2D illustrates providing thermal-based haptic feedback on a mobile device, according to some embodiments.

Similarly, FIG. 2D illustrates providing thermal-based haptic feedback on a mobile device 100, according to some embodiments. The thermal-based haptic feedback may be provided using the thermal generator 638. The thermal-based haptic feedback may include standard thermal-based haptic feedback 250 and increased intensity thermal-based haptic feedback 280. The increased intensity thermal-based haptic feedback 280 may result in more pronounced thermal feedback of the mobile device 100 that may be easier for the user to sense, feel, or otherwise notice. As described above, thermal-based haptic feedback is one of many types of haptic feedback that may be provided on the mobile device 100. In one embodiment, standard thermal-based haptic feedback 250 or increased intensity thermal-based haptic feedback 280 may be provided to the user based on the stable physical characteristics determined by the SPC detection module 308. For example, standard thermal-based haptic feedback 250 may be provided to users with stable physical characteristics that are average or close to average, whereas the increased intensity thermal-based haptic feedback 280 may be provided to users with stable physical characteristics associated with lower sensitivity to haptic feedback.

Figure 3:
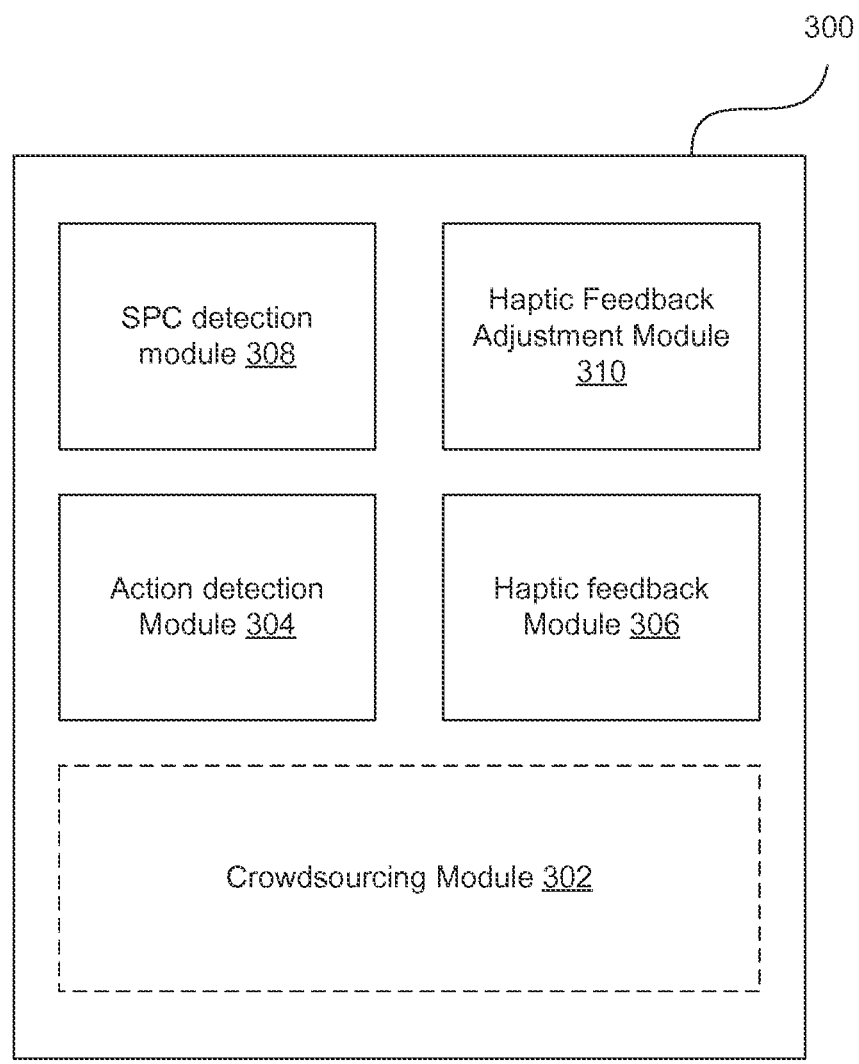
FIG. 3 illustrates a block diagram for example modules implemented in a mobile device according to one embodiment of the invention.

FIG. 3 illustrates a block diagram for example modules implemented in a mobile device according to one embodiment of the invention. The mobile device 100 may be a computing device implemented using one or more components described in FIG. 6. Modules, described in FIG. 3, may be implemented using software, firmware, hardware or any other combination thereof. In one embodiment, the modules described in FIG. 3 may be stored as software modules on a computer-readable medium 300 that may be any magnetic, electronic, optical, or other computer-readable storage medium. In one implementation, the computer-readable storage medium 300 may include an SPC detection module 308, an action detection module 304, a haptic feedback adjustment module 310, the haptic feedback module 306 and optionally a crowdsourcing module 302.

SPC-determining module 308 may be configured to receive input regarding the user and determine one or more stable physical characteristics associated with the user. In one aspect, stable physical characteristics may include an at least one physical characteristic that is non-changing with respect to a level of the physical activity of the user. Examples of stable physical characteristics may include, but are not limited to, one or more of age, gender, finger size, and/or visual impairments.

In some embodiments, the SPC detection module 308 of the mobile device 100 may determine stable physical characteristics by receiving and analyzing input regarding the user from various input devices, such as the microphone 622, camera 624 and any other suitable input device. For example, the mobile device 100 may use the user image 106 from the camera 624 and the user voice 108 from the microphone 622 in determining the age and gender of the user.

In another aspect, the SPC detection module 308 of the mobile device 100 may receive user information over a network using the communications subsystem 650 or access information stored on the mobile device 100 in the storage device 615 or the working memory 640. For example, the user may store on the mobile device 100 and/or retrieve over the network their profile for a social networking site. Such a profile may include user information such as age, gender, impairments, and/or other stable physical characteristics regarding the user. The SPC detection module 308 of the mobile device may use information from the user profile in determining the stable physical characteristics associated with the user.

Haptic feedback adjustment module 310 receives the one or more stable physical characteristics determined by the SPC detection module 308 and adjusts the haptic feedback for the mobile device 100. In one embodiment, the mobile device 100 may adjust the haptic feedback so that the haptic feedback does not increase above or decrease below predetermined limits for haptic feedback. In one embodiment, the level of adjustment may be based on pre-stored correlations stored on the mobile device 100. In another embodiment, the level of adjustment may be based on correlations received by a crowdsourcing server, as further described in reference to crowdsourcing module 302 and FIG. 5. In yet another embodiment, the haptic feedback adjustment module 310 may provide an interface to the user for manually updating the level of haptic feedback.

In some implementations, for adjusting the haptic feedback the haptic feedback adjustment module 310 may adjust the intensity of the haptic feedback, adjust the frequency of the haptic feedback, adjust the duration for which the haptic feedback is provided to the user of the device, and/or change a type of haptic feedback provided to the user of the device. Different types of haptic feedback may include one or more of vibration haptic feedback (FIG. 2A), electrostatic-based haptic feedback (FIG. 2B and FIG. 2C), and/or thermal-based haptic feedback (FIG. 2D).

Action detection module 304 may detect conditions for providing haptic feedback to the user of the mobile device 100. For example, the action detection module 304 may detect an incoming call and notify the haptic feedback module 306 so that the haptic feedback module 306 can provide haptic feedback to the user to respond to the incoming call. In the alternative, the action detection module 304 may also detect conditions that allow the mobile device 100 to provide haptic feedback to user interactions with the mobile device 100. For example, if the user touches a key on the virtual keyboard displayed on the mobile device screen, the action detection module 304 may determine the user's action as an event for the purposes of providing haptic feedback. In response to determining an event from the action detection module 304, the mobile device 100 may employ hardware components, such as the vibration motor 634, electrostatic unit 636 or the thermal generator 638, of the mobile device 100 for providing haptic feedback. The intensity, type, and/or frequency of the haptic feedback may be based on the adjustments made by the haptic feedback adjustment module 310.

Crowdsourcing module 302 may also be optionally implemented in some embodiments of the invention. In some implementations, the crowdsourcing module 302 may be configured to determine the desired haptic response for users with specific stable physical characteristics profile. For example, the crowdsourcing module 302 may determine that the users of the mobile device that are 65 years of age like having an intensity for the haptic feedback of 5% more than the average users. The crowdsourcing module 302 running on each mobile device may make such correlations between the stable physical characteristics and the haptic feedback settings. The crowdsourcing module 302 may be further configured to either individually or collectively send information regarding such correlations to a crowdsourcing server 502 for further processing. The crowdsourcing server 502 may use the received information from a plurality of mobile devices in adjusting the optimal settings for users with varied stable physical characteristics. In one implementation, the crowdsourcing server 502 may be capable of transmitting the updated setting to other mobile devices for improved haptic feedback response for users with specific stable physical characteristics.

Figure 4:
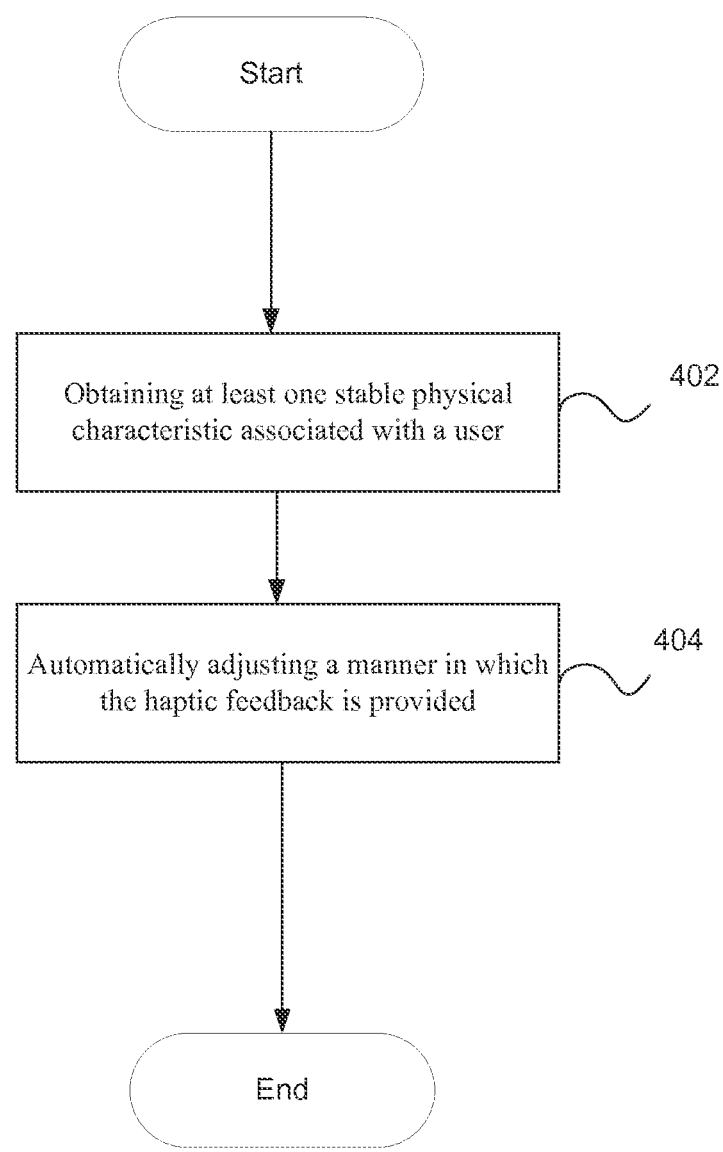
FIG. 4 is a flow diagram illustrating a method for performing embodiments of the invention according to one or more illustrative aspects of the disclosure.

FIG. 4 is a flow diagram illustrating a method for performing embodiments of the invention according to one or more illustrative aspects of the disclosure. According to one or more aspects, any and/or all of the methods and/or method steps, described in the flow diagram 400 illustrated in FIG. 4, may be implemented by a mobile device, such as the mobile device described in greater detail in FIG. 6, for instance. In one embodiment, one or more of the method steps described below with respect to FIG. 4 are implemented by a processor of the mobile device, such as the processor 610 or another processor. Modules and components discussed in FIG. 3 may also be implemented as components of the mobile device and may be used in performing embodiments of the invention as discussed in FIG. 6. Additionally or alternatively, any and/or all of the methods and/or method steps described herein may be implemented in computer-readable instructions, such as computer-readable instructions stored on a computer-readable medium such as the memory 640, storage 615 or another computer-readable medium.

At step 402, components of the mobile device 100, such as the SPC detection module 308, may obtain at least one stable physical characteristic associated with the user of the mobile device. In some embodiments, the at least one stable physical characteristic may include physical characteristics, such as age, gender, finger size, finger temperature and/or visual impairments. For example, generally, with increase of age, users may experience reduced sensitivity to haptic feedback. Similarly, men may have reduced sensitivity to touch relative to women. Furthermore, users with larger fingers may also experience reduced sensitivity. On the other hand, users with visual impairments may have heightened haptic sensitivity.

In one embodiment, the SPC detection module 308 may receive information using one or more input devices 620 and analyze the information, using one or more processors 610, to determine one or more stable physical characteristics from the received user information. For example, the SPC detection module 308 may receive a user image 108 using camera 622. The SPC detection module 308 may process aspects of the image, such as facial features, skin tone and/or hair color to determine the age and gender of the user, using demographical information.

At step 404, components of the mobile device 100, such as the haptic feedback adjustment module 310, may automatically adjust a manner in which the haptic feedback is provided to the user of the mobile device 100, based on at least one physical characteristic. Adjusting the haptic feedback may include adjusting the intensity, duration, frequency, changing the type of haptic feedback in response to detecting the one or more contextual factors, or any combination thereof. Examples of types of haptic feedback may include vibration-based haptic feedback, electrostatic-based haptic feedback and thermal-based haptic feedback. In one implementation, any combination of the various haptic feedback techniques may be adjusted based on the physical characteristics of the user.

In one embodiment, the mobile device 100 may automatically adjust a manner in which haptic feedback is provided to the user by maintaining a correlation table between each stable physical characteristic and the adjustment to the respective haptic feedback mechanism. For instance, in some scenarios, if the mobile device 100 detects that the user using the device is 65 years of age, the selected haptic feedback from the table may be more intense than if the mobile device 100 detects that the user is 23 years of age. In one embodiment, the table correlating the stable physical characteristics to the manner and level of adjustment to the haptic feedback may be stored in the storage device 615 and also temporarily stored in the working memory 640.

In certain embodiments, a plurality of stable physical characteristics may be used collectively to determine the adjustment needed in the manner the haptic feedback is provided. For instance, if the user is a male senior citizen with relatively larger finger size, the intensity of the haptic feedback may be increased more than the detection of any one physical characteristic on its own. However, the intensity of the haptic feedback may also be limited by going beyond a predetermined threshold, so that it does not increase a predetermined constraint level radically due to the multiplicity effect of multiple physical characteristics.

In certain embodiments, the adjustment response to the physical characteristics may be determined at least partially using data from crowdsourcing. For example, the device may retrieve data regarding the manual adjusting of the manner in which the haptic feedback is provided for a plurality of other devices for a particular physical characteristic for automatically determining the appropriate adjustment to the haptic feedback for the user's device.

It should be appreciated that the specific steps illustrated in FIG. 4 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Figure 5:
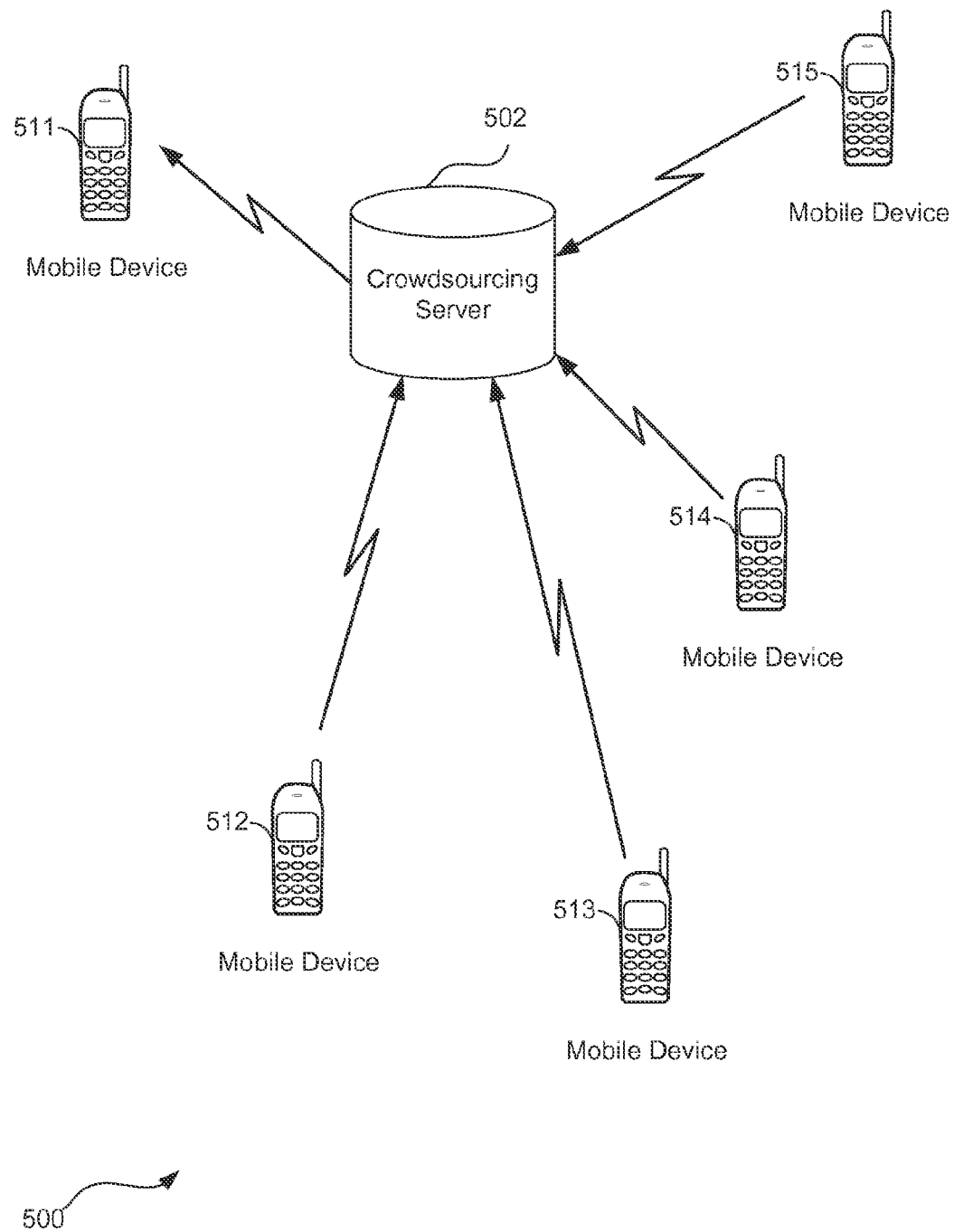
FIG. 5 illustrates an example configuration with a plurality of mobile devices and a crowdsourcing server.

FIG. 5 illustrates a configuration 500 with a plurality of mobile devices (511, 512, 513, 514 and 515) and a crowdsourcing server 502. In one embodiment, components of the crowdsourcing server 502 may be implemented using components discussed with reference to FIG. 6. In FIG. 5, embodiments of the invention may use techniques such as crowdsourcing for aggregating data associated with one or more mobile devices. In one implementation, multiple mobile devices may collect data associated with the correlation between stable physical characteristics and the haptic feedback adjustments on the mobile devices and communicate the data to a crowdsourcing server 502. The crowdsourcing server 502 may receive and aggregate data received from a plurality of mobile devices. The aggregated data may include more robust correlations between the stable physical characteristic and the haptic feedback associated with the stable physical characteristics.

FIG. 5 shows aggregating correlation data between the stable physical characteristics and the haptic feedback for several mobile devices. For example, FIG. 5 shows aggregating data from mobile devices 512-515 at the crowdsourcing server 502. In one embodiment, the improved correlations may be used by the crowdsourcing server 502 in updating correlation tables in the haptic feedback adjustment module 310 in mobile device 511. The updates may be sent by the crowdsourcing server 502 to mobile device 511 wirelessly or through a wired connection. The reliability of the correlation data between the stable physical characteristics and the respective manner in which haptic feedback is provided to the user may increase as the number of data points aggregated by the crowdsourcing server 502 increases.

Figure 6:
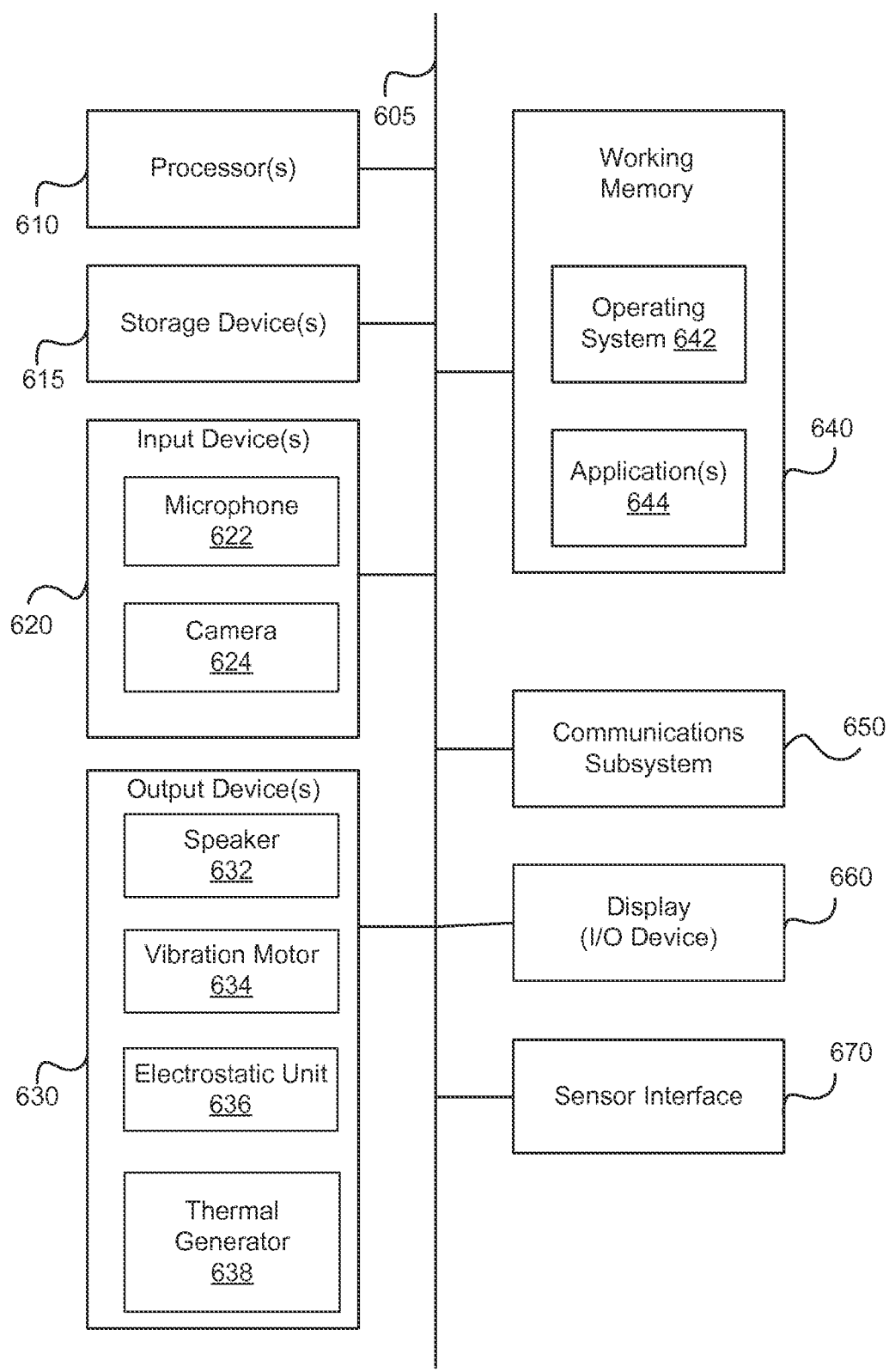
FIG. 6 illustrates an example of a computing device in which one or more embodiments may be implemented.

FIG. 6 illustrates an example computing device incorporating parts of the device employed in practicing embodiments of the invention. A computing device as illustrated in FIG. 6 may be incorporated as part of any computerized system, herein. For example, computing device 600 may represent some of the components of a mobile device and/or crowdsourcing server. Examples of a computing device 600 include, but are not limited to, video game consoles, tablets, smart phones, laptops, netbooks, or other portable devices. FIG. 6 provides a schematic illustration of one embodiment of a computing device 600 that may perform the methods provided by various other embodiments, as described herein, and/or may function as the host computing device, a remote kiosk/terminal, a point-of-sale device, a mobile multifunction device, a set-top box and/or a computing device. FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computing device 600 is shown comprising hardware elements that may be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 620, which may include without limitation one or more microphones 622, cameras 624, mouse, keyboard and/or the like; one or more output devices 630, which may include without limitation one or more speakers 632, electrostatic units 634, vibration motor 636 and thermal generator 638. Additionally, the computing device 600 may include a communications subsystem 650, one or more displays, that may perform both input and/or output functions, and one or more sensors 670. The one or more processors might be coupled to working memory 640 that may store portions of the operating system 642 and one or more applications 644.

The computing device 600 may further include (and/or be in communication with) one or more non-transitory storage devices 615, which may comprise, without limitation, local and/or network accessible storage, and/or may include, without limitation, a disk drive, a drive array, an optical storage device, a solid-form storage device such as a random access memory ("RAM") and/or a read-only memory ("ROM"), which may be programmable, flash-updateable and/or the like. Such storage devices may be configured to implement any appropriate data storage, including without limitation, various file systems, database structures, and/or the like.

The input devices 620 may include any device that accepts input from a user or the surrounding of the computing device 600. Examples may include a keyboard, keypad, mouse, touch input, microphones 622, cameras 624, and/or display devices 660. Microphone 622 may be any device that converts a sound input to an electrical signal. The microphone 622 may capture a user's voice or any other sound in a proximity to the computing device 600. The computing device 600 may have one or more cameras 624 for obtaining image information that may include the user's image or the image of the surrounding of the computing device 600. In one implementation, the computing device 600 may include front-facing and back-facing cameras.

Output devices 630 may include a myriad of devices that may provide information to the user of the computing device 600. For example, the output devices may include one or more speakers 632, vibration motor 634, electrostatic unit 636, thermal generator 638 and/or display device 660. Speaker 632 may be any device that outputs sound to a user. Examples may include a built-in speaker or any other device that produces sound in response to an electrical audio signal.

Vibration motor 634 may be a small electric motor connected to an eccentric weight. Vibration motor 634 may be configured to vibrate upon an event related to communication device 100. In one implementation, the vibration motor 634 may include actuators that may produce vibrations (e.g., electro-active polymer, piezo actuators). Examples of vibration motors may include, but are not limited to eccentric rotating mass (ERM), Linear resonant actuators (LRA), and Multi-function actuators (MFA). The vibration generated by the vibration motor 634 may vibrate computing device 600 such that a user can feel, sense, or otherwise notice the vibration. It can be appreciated that vibration motor 634 can generate a vibration simultaneous to an audio alert generated by speaker 632.

Electrostatic unit 636 may be configured to generate an electric charge through display 660. More specifically, the electrostatic unit 636 can generate varying electrostatic fields that can be pushed through a surface of display 660 giving the user of the computing device 600 a feeling of various levels of friction when interacting (e.g. touching) with the display 660.

Thermal generator 638 may be configured to generate heat through computing device 600. More specifically, thermal generator 638 may generate heat through various surfaces of computing device 600, including the display 660 or any other part of the body. The user of computing device 600 may feel or otherwise notice the heat generated by the thermal generator 638.

Display 660 may be any device that displays information to a user. Examples may include an LCD screen, CRT monitor, or seven-segment display. In some embodiments, display 660 may be a touchscreen display capable of providing haptic feedback.

The communications subsystem 650 may include a transceiver for receiving and transmitting data or a wired and/or wireless medium. The communications subsystem 650 may also include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 650 may permit data to be exchanged with a network (such as the network described below, to name one example), other computing devices, and/or any other devices described herein.

In many embodiments, the computing device 600 will further comprise a non-transitory working memory 640, which may include a RAM or ROM device, as described above. The computing device 600 may comprise software elements, shown as being currently located within the working memory 640, including an operating system 642, device drivers, executable libraries, and/or other code, such as one or more application programs 644, which may comprise computer programs provided by various embodiments, and/or may be designed to implement methods, and/or configure systems, provided by other embodiments, as described herein. In one implementation, components or modules of FIG. 3 may be performed using such software elements and may be stored in storage device 615 and/or the working memory 640. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a computer-readable storage medium, such as the storage device(s) 615 described above. In some cases, the storage medium might be incorporated within a computing device, such as computing device 600. In other embodiments, the storage medium might be separate from a computing device (e.g., a removable medium, such as a compact disc), and/or provided in an installation package, such that the storage medium may be used to program, configure and/or adapt a general purpose computer with the instructions/code stored thereon. These instructions might take the form of executable code, which is executable by the computing device 600 and/or might take the form of source and/or installable code, which, upon compilation and/or installation on the computing device 600 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices 600 such as network input/output devices may be employed.

Some embodiments may employ a computing device (such as the computing device 600) to perform methods in accordance with the disclosure. For example, some or all of the procedures of the described methods may be performed by the computing device 600 in response to processor 610 executing one or more sequences of one or more instructions (which might be incorporated into the operating system 642 and/or other code, such as an application program 644) contained in the working memory 640. Such instructions may be read into the working memory 640 from another computer-readable medium, such as one or more of the storage device(s) 615. Merely by way of example, execution of the sequences of instructions contained in the working memory 640 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computing device 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as the storage device(s) 615. Volatile media include, without limitation, dynamic memory, such as the working memory 640. Transmission media include, without limitation, coaxial cables, copper wire and fiber optics, including the wires that comprise the bus 605, as well as the various components of the communications subsystem 650 (and/or the media by which the communications subsystem 650 provides communication with other devices). Hence, transmission media may also take the form of waves (including without limitation radio, acoustic and/or light waves, such as those generated during radio-wave and infrared data communications). In an alternate embodiment, event-driven components and devices, such as cameras, may be used, where some of the processing may be performed in analog domain.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer may read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 600. These signals, which might be in the form of electromagnetic signals, acoustic signals, optical signals and/or the like, are all examples of carrier waves on which instructions may be encoded, in accordance with various embodiments of the invention.

The communications subsystem 650 (and/or components thereof) generally will receive the signals, and the bus 605 then might carry the signals (and/or the data, instructions, etc. carried by the signals) to the working memory 640, from which the processor(s) 610 retrieves and executes the instructions. The instructions received by the working memory 640 may optionally be stored on a non-transitory storage device 615 either before or after execution by the processor(s) 610.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for providing haptic feedback on a device, comprising:
   obtaining, using a sensor of the device, one or more sensor readings associated with a user;

detecting at least one stable physical characteristic of the user based, at least in part, on the one or more sensor readings, wherein the at least one stable physical characteristic comprises an at least one physical characteristic that is non-changing with respect to a level of physical activity of the user; and automatically adjusting, by the device, a manner in which the haptic feedback is provided to the user of the device based at least on the at least one stable physical characteristic.

2. The method of claim 1, wherein the at least one stable physical characteristic comprises an age.

3. The method of claim 1, further comprising detecting a plurality of stable physical characteristics associated with the user and automatically adjusting a manner in which the haptic feedback is provided to the user of the device based on the plurality of stable physical characteristics.

4. The method of claim 3, further comprising automatically adjusting the manner in which the haptic feedback is provided to not exceed a pre-determined constraint.

5. The method of claim 1, further comprising automatically adjusting at least one of a non-zero value of frequency, duration, or amplitude of the manner in which the haptic feedback is provided based at least on retrieving data associated with a manual adjusting of a frequency, duration, or amplitude of a manner in which the haptic feedback is provided for a plurality of devices for the at least one stable physical characteristic.

6. The method of claim 1, wherein the adjusting comprises one or more of adjusting an intensity of the haptic feedback, a frequency of the haptic feedback, a duration for which the haptic feedback is provided to the user of the device, or a type of haptic feedback provided to the user of the device.

7. The method of claim 1, wherein the device is a mobile device.

8. The method of claim 1, wherein a sensor reading of the one or more sensor readings is indicative of a pressure applied to the device by an appendage or a digit of the user.

9. The method of claim 1, wherein the manner in which the haptic feedback is provided is automatically adjusted from a baseline manner in which the haptic feedback is provided based upon a difference between the at least one stable physical characteristic and a baseline stable physical characteristic.

10. The method of claim 9, wherein:
the baseline manner in which the haptic feedback is provided comprises a baseline frequency, duration, or amplitude; and
a frequency, duration, or amplitude of the manner in which the haptic feedback is provided is automatically adjusted from the corresponding baseline frequency, duration, or amplitude.

11. The method of claim 1, wherein the detecting the at least one stable physical characteristic is performed without the user specifying a value indicative of the at least one stable physical characteristic to the device.

12. A device for providing haptic feedback, the device comprising:
a sensor configured to sense one or more sensor readings associated with a user; and
one or more processors configured to:
detect at least one stable physical characteristic of the user based, at least in part, on the one or more sensor readings, wherein the at least one stable physical characteristic comprises an at least one physical characteristic that is non-changing with respect to a level of physical activity of the user; and
automatically adjust in a manner in which the haptic feedback is provided to the user of the device based on the at least one stable physical characteristic.

13. The device of claim 12, wherein the at least one stable physical characteristic comprises one or more of age, gender, race, finger size, and visual impairments.

14. The device of claim 12, further comprising obtaining a plurality of stable physical characteristics, by the one or more processors, associated with the user and automatically adjusting, by the one or more processors, a manner in which the haptic feedback is provided to the user of the device based on the plurality of stable physical characteristics.

15. The device of claim 14, further comprising automatically adjusting the manner in which the haptic feedback is provided to not exceed a pre-determined constraint.

16. The device of claim 12, further comprising automatically adjusting, by the one or more processors, the manner in which the haptic feedback is provided based at least on retrieving data associated with a manual adjusting of a manner in which the haptic feedback is provided for a plurality of devices for the at least one stable physical characteristic.

17. The device of claim 12, wherein the adjusting comprises one or more of adjusting intensity of the haptic feedback, frequency of the haptic feedback, duration for which the haptic feedback is provided to the user of the device, and changing a type of haptic feedback provided to the user of the device.

18. The device of claim 12, wherein the device is a mobile device.

19. The device of claim 12, wherein the device is incorporated in a vehicle.

20. A non-transitory computer-readable storage medium, wherein the non-transitory computer-readable storage medium comprises instructions that, when executed by one or more processors, the cause the one or more processors to:
obtain, using a sensor of the device, one or more sensor readings associated with a user;
detect at least one stable physical characteristic of the user based, at least in part, on the one or more sensor readings, wherein the at least one stable physical characteristic comprises an at least one physical characteristic that is non-changing with respect to a level of physical activity of the user; and
automatically adjust a manner in which haptic feedback is provided to the user of a device, based at least on the at least one stable physical characteristic.

21. The non-transitory computer-readable storage medium of claim 20, wherein the at least one stable physical characteristic comprises one or more of age, gender, race, finger size, or visual impairments.

22. The non-transitory computer-readable storage medium of claim 20, wherein the instructions cause the one or more processors to:
obtain a plurality of stable physical characteristics associated with the user; and
automatically adjust a manner in which the haptic feedback is provided to the user of the device based on the plurality of stable physical characteristics.

23. The non-transitory computer-readable storage medium of claim 22, wherein the instructions cause the one or more processors to automatically adjust the manner in which the haptic feedback is provided to not exceed a pre-determined constraint.

24. The non-transitory computer-readable storage medium of claim 20, wherein the instructions cause the one or more processors to automatically adjust the manner in which the haptic feedback is provided based at least on retrieving data associated with a manual adjusting of a manner in which the haptic feedback is provided for a plurality of devices for the at least one stable physical characteristic.

25. The non-transitory computer-readable storage medium of claim 20, wherein adjusting comprises one or more of adjusting an intensity of the haptic feedback, a frequency of the haptic feedback, a duration for which the haptic feedback is provided to the user of the device, or a type of haptic feedback provided to the user of the device.

26. The non-transitory computer-readable storage medium of claim 20, wherein the device is a mobile device.

27. The non-transitory computer-readable storage medium of claim 20, wherein the device is incorporated in a vehicle.

28. An apparatus, comprising:
 a means for obtaining one or more sensor readings associated with a user;
 a means for detecting at least one stable physical characteristic of the user based, at least in part, on the one or more sensor readings, wherein the at least one stable physical characteristic comprises an at least one physical characteristic that is non-changing with respect to a level of physical activity of the user; and
 a means for automatically adjusting a manner in which haptic feedback is provided to the user of the apparatus based at least on the at least one stable physical characteristic.

29. The apparatus of claim 28, wherein the at least one stable physical characteristic comprises one or more of age, gender, race, finger size, or visual impairments.

30. The apparatus of claim 28, further comprising:
 a means for obtaining a plurality of stable physical characteristics associated with the user; and
 a means for automatically adjusting a manner in which the haptic feedback is provided to the user of the apparatus based on the plurality of stable physical characteristics.

* * * * *